Patented Sept. 7, 1954

2,688,624

UNITED STATES PATENT OFFICE 2,688,624

TRIBROMOSTEROIDS

Robert Bruce Moffett, Kalamazoo, Mich., assignor to The Upjohn Company, Kalamazoo, Mich., a corporation of Michigan No Drawing. Application March 21, 1952, Serial No. 277,912

8 Claims. (Cl. 260—397.47)

This invention relates to novel tribromosteroids and is more particularly concerned with novel 3 - acyloxy - 5,6,21 - tribromopregnane-20-ones and to a novel process for the production thereof, which may be represented by the structural formulae:

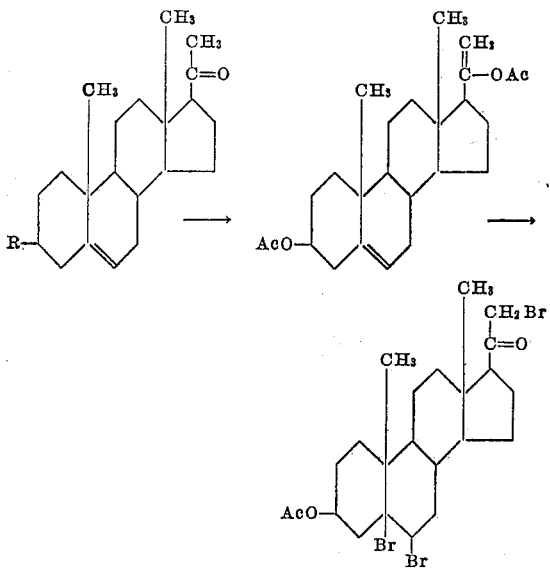

wherein R is hydroxy or acyloxy and includes both alpha and beta forms, and AcO is acyloxy and includes in the 3-position the alpha and beta forms.

The novel compounds of the present invention are the 3-acyloxy-5,6,21-tribromopregnane-20-ones wherein the acyloxy group has the formula AcO, Ac being the acyl radical of an organic carboxylic acid.

It is an object of the present invention to provide a novel group of compounds which are useful in the preparation of steroid compounds containing an oxygen atom at carbon atoms 20 and 21. Another object of the invention is the provision of a process for the production of the novel compounds, 3-acyloxy-5,6,21-tribromopregnane-20-ones. Other objects will be apparent to those skilled in the art to which this invention pertains.

The compounds of the present invention, as previously stated, are useful in the preparation of steroid compounds containing an oxygen atom at carbon atoms 20 and 21, namely, 20-keto-21-hydroxy or 21-acyloxysteroids. Among the useful physiologically active steroids preparable from the products of the present invention is the known 11-desoxycorticosterone acetate (21-acetoxy-4-pregnene-3,20-dione). Treatment of 3-acetoxy - 5,6,21 - tribromopregnane-20-one with potassium iodide and ethyl alcohol is productive of the known 3-acetoxy-21-iodo-5-pregnene-20-one which in turn is converted to 11-desoxycorticosterone acetate according to known procedures.

The starting compounds of the present invention are the 3,20-diacyloxy-5,20-pregnadienes which may be prepared by the treatment of 3-hydroxy- or 3-acyloxy-5-pregnene-20-ones with isopropenyl acetate in the presence of an acid catalyst such as paratoluenesulfonic acid, sulfosalicylic acid, sulfoacetic acid, and others. Following this procedure, reacting 3α- or 3β-hydroxy-5-pregnene-20-one or a 3α- or 3β-acyloxy-5-pregnene-20-one with other isopropenyl acylates is productive of other 20(21)enolesters of the 20-ketone. However following the method of the present invention, these esters produce the same product as the corresponding 3-acyloxy-20-acetoxy-5,20-pregnadienes. Conveniently, after removal of the excess isopropenyl acylate, this reaction mixture may be brominated directly to produce the products of the present invention. Treatment of the above-named compounds with about two molar equivalents of bromine at a temperature between about minus forty degrees and about plus forty degrees centigrade in a solvent such as, for example, methylene chloride, chloroform, methylchloroform, and others, is productive of a 3-acyloxy-5,6,21-tribromopregnane-20-one.

The following examples are illustrative of the process and products of the present invention but are not to be construed as limiting.

*Preparation.—3β,20-diacetoxy-5,20-pregnadiene*

Two grams of 3β-acetoxy-5-pregnene-20-one, twenty milliliters of isopropenyl acetate and 0.1 gram of para-toluenesulfonic acid were heated under reflux, with the concomitant removal of a mixture of acetone and isopropenyl acetate from the refluxing mixture, for eight hours. The para-toluenesulfonic acid was neutralized by the addition of solid sodium bicarbonate and the excess isopropenyl acetate was then removed under reduced pressure. Cold water and methylene chloride were added with stirring to the residue. The methylene chloride layer was separated, washed with water, dried over anhydrous sodium sulfate and the solvent was then removed. The residue, after crystallization from a mixture of methanol and methyl ethyl ketone, yielded 3β,20-diacetoxy-5,20-pregnadiene, which melted at 122.5 to 123.5 degrees centigrade and had an $[\alpha]_D^{26.5}$ of minus 45.8 degrees (1.623 percent in chloroform).

*Example.—3β-acetoxy-5,6,21-tribromopregnane-20-one*

A solution of one gram (0.0025 mole) of 3β,20-diacetoxy-5,20-pregnadiene in 25 milliliters of methylene chloride was cooled to below minus ten degrees centigrade using an ice-salt bath and there was then added thereto with stirring, over a period of 25 minutes, 16.6 milliliters (0.005 mole) of a 0.602 normal methylene chloride solution of bromine. The resulting colorless solution was distilled, at reduced pressure, to dryness at temperature below twenty degrees centigrade. The 20-one weighed 1.5 grams and was converted, residue of 3 β-acetoxy-5,6,21-tribromopregnane-without further purification, to the known 3β,21-diacetoxy-5-pregnene-20-one according to the method described below.

The residue can be purified, if desired, to yield product melting at 145 to 148 degrees centigrade, by dissolving in acetone, filtering, and chilling the filtrate. The crystals thus-obtained upon recrystallization from acetone, melt (with decomposition) at 165 to 167 degrees centigrade.

*3β-acetoxy-21-iodo-5-pregnene-20-one*

The residue of 3β-acetoxy-5,6,21-tribromopregnane-20-one from the above example was dissolved in 25 milliliters of benzene, whereafter a solution of five grams of sodium iodide in 25 milliliters of absolute ethanol was added thereto and the whole kept at room temperature for 26 hours. The reaction mixture was then diluted with water and the whole extracted twice with ether. The combined ether extracts were washed twice with a cold one percent sodium hydroxide solution, washed until essentially neutral with water, and thereafter dried with anhydrous sodium sulfate. The ether solution was evaporated at reduced pressure to dryness at a temperature below thirty degrees centigrade, leaving a crystalline residue of the known 3β-acetoxy-21-iodo-5-pregnene-20-one [Reichstein and Schindler, Helv. Chim. Acta, 23, 669 (1940)] which was converted, without further purification, to the known 3β,21-diacetoxy-5-pregnene-20-one according to the method described below.

3β-acetoxy-21-iodo-5-pregnene-20-one, melting at 125 to 129 degrees centigrade, was obtained upon recrystallization of the above reaction mixture from an ether and pentane mixture.

*3β,21-diacetoxy-5-pregnene-20-one*

The crystalline residue of 3β-acetoxy-21-iodo-5-pregnene-20-one obtained from the above reaction was dissolved in 35 milliliters of acetone and there was then added thereto five grams of potassium bicarbonate and three milliliters of glacial acetic acid. The mixture was stirred and refluxed for twelve hours, thereafter diluted with ice water and the whole then extracted twice with ether. The combined ether extracts were washed with water, a cold dilute sodium thiosulfate solution, and water, respectively, and thereafter dried with anhydrous sodium sulfate. Complete esterification was ensured by removal of the ether at reduced pressure below thirty degrees centigrade and treatment of the residue for one hour with a mixture of three milliliters of acetic anhydride in five milliliters of pyridine. Ice water was added to the reaction mixture and the whole then extracted twice with ether, whereafter the ether extracts were successively washed with cold dilute hydrochloric acid, water, a cold dilute sodium bicarbonate solution, and twice with water. The ether solution was dried with anhydrous sodium sulfate and the volume of the ether thereafter reduced to about ten milliliters by distillation at atmospheric pressure, at which time crystallization of the product commenced. The cooled mixture was filtered, the crystals washed with ether and dried to yield 0.44 gram of 3β,21-diacetoxy-5-pregnene-20-one, melting at 159 to 162 degrees centigrade. An additional 0.07 gram of product was obtained from the filtrate and washings. A mixed melting point with an authentic sample of 3β,21-diacetoxy-5-pregnene-20-one gave no depression.

Saponification of the thus-produced 3,21-diacetoxy-5-pregnene-20-one, re-esterification of the 21-hydroxy group followed by oxidation of the 3-hydroxy group to a 3-keto group, all according to known procedures, is productive of an ester of 11-desoxycorticosterone which in turn may be saponified, if desired, to 11-desoxycorticosterone.

Additional illustrations of the scope of the present invention are as follows:

In the same manner as given in the above example, 3α-acetoxy-5,6,21-tribromopregnane-20-one is prepared by reacting 3α,20-diacetoxy-5,20-pregnadiene with about two molar equivalents of bromide in methylene chloride solvent. The starting 20-diacetoxy-5,20-pregnadiene is prepared by reacting 3α-hydroxy-5-pregnene-20-one (3-iso-pregneneolone) with isopropenyl acetate in the presence of para-toluenesulfonic acid according to the method given in the above preparation.

In the same manner as given in the above example, 3β - propionyloxy - 5,6,21 - tribromopregnane-20-one is prepared by reacting 3β-propionyloxy-20-acetoxy-5,20-pregnadiene with about two molar equivalents of bromine in methylene chloride solvent. The starting 3β-propionyloxy-20-acetoxy-5,20-pregnadiene is prepared by reacting 3β-propionyloxy-5-pregnene-20-one, which in turn may be prepared by reacting pregnenolone (3β-hydroxy-5-pregnene-20-one) with propionic anhydride in pyridine, with isopropenyl acetate in the presence of para-toluenesulfonic acid according to the method given in the above preparation.

In the same manner as given in the above example, 3α - propionyloxy - 5,6,21 - tribromopregnane-20-one is prepared by reacting 3α-propionyloxy-20-acetoxy-5,20-pregnadiene with about two molar equivalents of bromine in methylene chloride solvent. The starting 3α-propionyloxy-20-acetoxy-5,20-pregnadiene is prepared by reacting 3α - propionyloxy - 5 - pregnene - 20 - one, which in turn may be prepared by reacting 3α-hydroxy-5-pregnene-20-one with propionic anhydride in pyridine, with isopropenyl acetate in the presence of para-toluenesulfonic acid according to the method given in the above preparation.

In a similar manner, other 3α- or 3β-acyloxy-5,6,21-tribromopregnane-20-ones wherein the acyloxy group has the formula AcO, Ac being the acyl radical of a hydrocarbon carboxylic acid containing from one to eight carbon atoms such as, for example, formic, acetic, propionic, butyric, valeric, hexanoic, heptanoic, octanoic, phenylacetic, toluic, benzoic, cyclopentylcarboxylic, cyclohexylcarboxylic, β-cyclopentylpropionic, and others, are prepared by reacting the selected 3α,20- and 3β,20-diacyloxy-5,20-pregnadiene with bromine in a solvent such as, for example, methylene chloride, chloroform, methylchloroform, and others, the acyloxy groups of the product depending upon the 3-acyloxy group of the selected starting compound.

The starting 3α,20- or 3β,20-diacyloxy-5,20-pregnadienes are prepared by reacting 3α-hydroxy- or 3β-hydroxy-5-pregnene-20-one with an acylating agent such as ketene, a ketene of a selected acid, an acid, acid anhydride or acid chloride, in an organic solvent such as pyridine, benzene, toluene and others and thereafter reacting the thus-produced 3α- or 3β-acyloxy-5-pregnene-20-one with isopropenyl acetate or selected isopropenyl acylate in the presence of a suitable acid catalyst such as, for example, para-toluenesulfonic acid, sulfoacetic acid, sulfosalicylic acid and others, to produce 3α,20- and 3β,20-diacyloxy-5,20-pregnadienes wherein the acyloxy groups are of the formula AcO, Ac being the acyl radical of an organic carboxylic acid, such as, for example, formic, acetic, propionic, butyric, valeric, hexanoic, heptanoic, octanoic, benzoic, phenylacetic, toluic, cyclopentylcarboxylic, β-cyclopentylpropionic, cyclohexylcarboxylic, and others. Alternatively, the 3α- or 3β-hydroxy-5-pregnene-20-one may be reacted directly with isopropenyl acetate or a selected isopropenyl acylate in the presence of an acid catalyst, as before mentioned, to produce a 3,20-diacyloxy-5,20-pregnadiene wherein the 3- and the 20-acyloxy groups are identical.

It is to be understood that the invention is not to be limited to the exact details of operation or exact compounds as shown and described as obvious modifications and equivalents will be apparent to one skilled in the art and the invention is therefore to be limited only by the scope of the appended claims.

I claim:

1. A 3-acyloxy - 5,6,21 - tribromopregnane-20-one, wherein the acyloxy group has the formula AcO, Ac being the acyl radical of a hydrocarbon carboxylic acid containing from one to eight carbon atoms, inclusive.

2. 3β-acetoxy-5,6,21-tribromopregnane-20-one.

3. 3α-acetoxy-5,6,21-tribromopregnane-20-one.

4. A process for the production of a 3-acyloxy-5,6,21 - tribromopregnane-20 - one which comprises: reacting a 3,20-diacyloxy-5,20-pregnadiene wherein the acyloxy groups have the formula AcO, Ac being the acyl radical of an organic carboxylic acid, with about two molar equivalents of bromine and separating the thus-produced 3-acyloxy-5,6,21-tribromopregnane-20-one.

5. A process for the production of 3β-acetoxy-5,6,21-tribromopregnane which comprises: reacting 3β,20-diacetoxy-5,20-pregnadiene with about two molar equivalents of bromine and separating the thus-produced 3β-acetoxy-5,6,21-tribromopregnane.

6. A process for the production of a 3-acyloxy-5,6,21 - tribromopregnane - 20-one which comprises: reacting a compound selected from the group consisting of 3-hydroxy-5-pregnene-20-one and 3-acyloxy-5-pregnene-20-one with an isopropenyl acylate, wherein the acyloxy group has the formula AcO, Ac being the acyl radical of an organic carboxylic acid, in the presence of an acidic catalyst to produce a 3,20-diacyloxy-5,20-pregnadiene, and reacting the thus-produced 3,20-diacyloxy-5,20-pregnadiene with about two molar equivalents of bromine to produce a 3-acyloxy-5,6,21-tribromopregnane-20-one.

7. The process of claim 6 wherein the isopropenyl acylate is isopropenyl acetate.

8. A process for the production of 3β-acetoxy-5,6,21 - tribromopregnane - 20-one which comprises: reacting 3β-hydroxy-5-pregnene-20-one with isopropenyl acetate in the presence of an acidic catalyst to produce 3β,20-diacetoxy-5,20-pregnadiene, and reacting the thus-produced 3β,20-diacetoxy-5,20-pregnadiene with about two molar equivalents of bromine to produce 3β-acetoxy-5,6,21-tribromopregnane-20-one.

References Cited in the file of this patent

UNITED STATES PATENTS

| Number | Name | Date |
|---|---|---|
| 2,312,481 | Reichstein | Mar. 2, 1943 |